Dec. 23, 1958   J. H. ZILLMAN ET AL   2,865,168
FUEL BURNING REACTION MOTOR POWERED HYDRAULIC
AND ELECTRIC POWER UNIT
Filed July 9, 1952   3 Sheets-Sheet 1
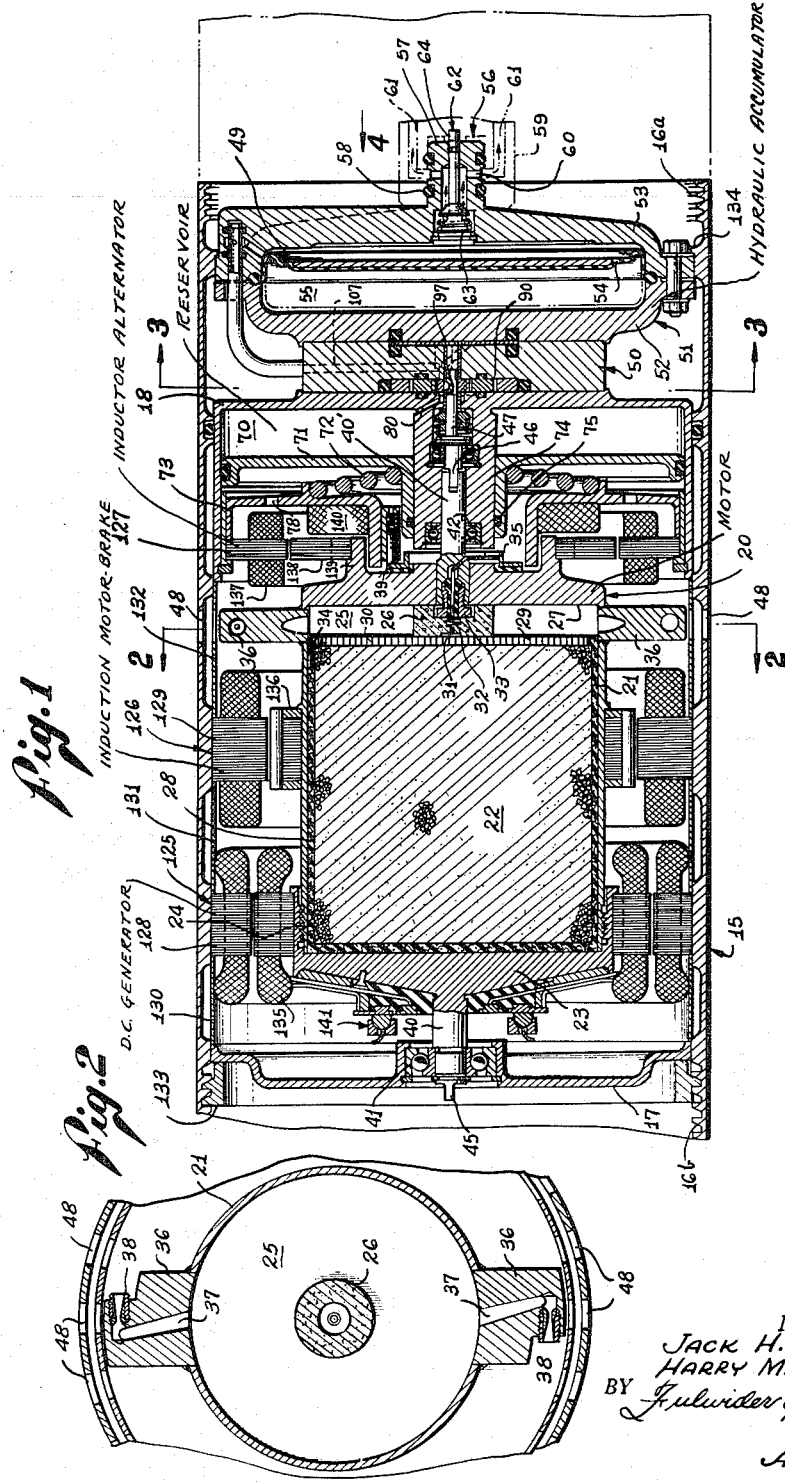
INVENTORS
JACK H. ZILLMAN
HARRY M. STEELE JR.
BY Fulwider & Mattingly
Attorneys Dec. 23, 1958     J. H. ZILLMAN ET AL     2,865,168
FUEL BURNING REACTION MOTOR POWERED HYDRAULIC
AND ELECTRIC POWER UNIT
Filed July 9, 1952     3 Sheets-Sheet 2
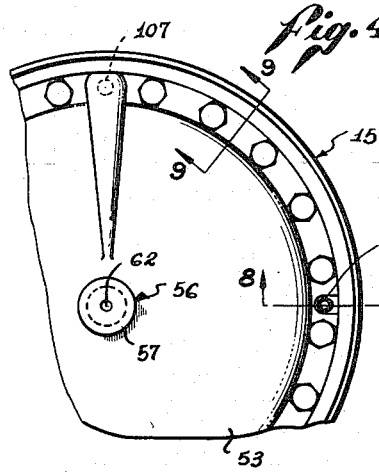
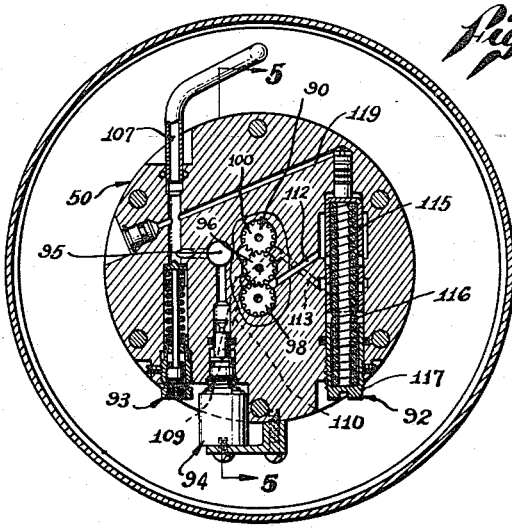
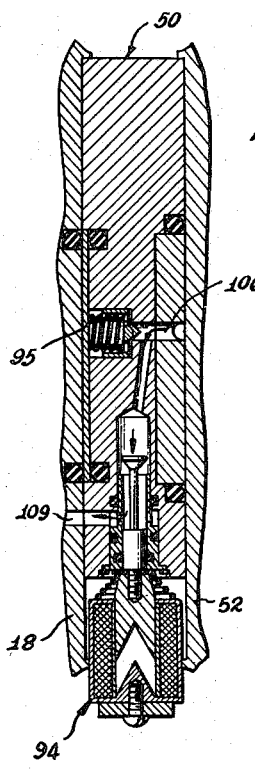
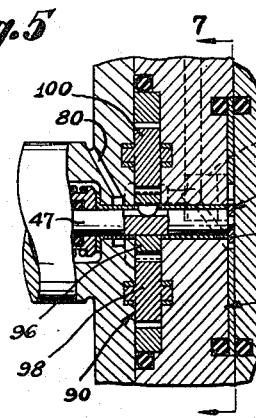
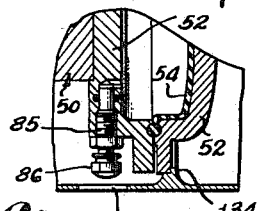
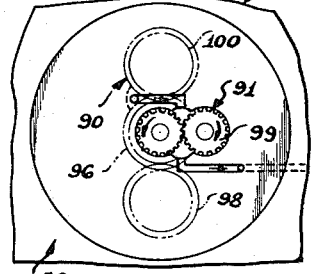
INVENTORS
JACK H. ZILLMAN
HARRY M. STEELE JR.
BY Fulwider & Mattingly
Attorneys Dec. 23, 1958   J. H. ZILLMAN ET AL   2,865,168
FUEL BURNING REACTION MOTOR POWERED HYDRAULIC
AND ELECTRIC POWER UNIT
Filed July 9, 1952   3 Sheets-Sheet 3

INVENTORS
JACK H. ZILLMAN
HARRY M. STEELE JR.
BY
Fulwider & Mattingly
Attorneys

United States Patent Office 2,865,168
Patented Dec. 23, 1958

2,865,168

FUEL BURNING REACTION MOTOR POWERED HYDRAULIC AND ELECTRIC POWER UNIT

Jack H. Zillman, Manhattan Beach, and Harry M. Steele, Jr., Pacific Palisades, Calif., assignors of one-third to Alex Deutsch, one-third to Lester Deutsch and one-third to Ben Weingart Application July 9, 1952, Serial No. 297,934

20 Claims. (Cl. 60—39.14)

This application is a continuation-in-part of our co-pending application, Serial No. 205,489, filed January 11, 1951, now abandoned, entitled Rocket Propelled Motor.

The present invention relates generally to mechanical, hydraulic, and electrical power supplies, and more particularly, to a power unit for use in guided missiles and similar devices having a short operational time span, to supply pressurized fluid for hydraulic controls, and also to supply electric power, both A. C. and D. C., for other purposes in such devices.

The term "guided missile" has been used to embrace various types of aerial missiles, including glide bombs, rockets, engine-driven aircraft, and the like, used for military and meteorological purposes, and having the common characteristic of remote control guidance. Such devices are frequently rocket propelled, having a relatively short maximum flight time. Since it is a principal purpose of such devices when used for military purposes, to carry a maximum load of destructive explosives, it is highly desirable that all unnecessary weight and complexity of the navigational and flight control systems be eliminated. Still further, it is essential to accurate guiding of such missiles that the power utilized in operating control surfaces and the like be delivered at the substantially uniform rate throughout the flight, whereby the effectiveness of control may be as great near the end of the flight as it is in the initial phases.

Heretofore, electric power in guided missiles has been supplied in various ways, for example from batteries, and in a few instances, from propeller driven generators operating on the slip stream of the moving missile. Batteries as a source of electric power have the disadvantage of excessive weight, and also the fact that they tend to freeze and become ineffective at the extremely low temperatures encountered at high altitudes. The slip stream operated generator has the disadvantages of extreme inefficiency and the fact that the power delivered is not independent of the speed of the missile and thus difficult to maintain at a constant value. Furthermore, such a generator cannot be operated conveniently during the warm-up period prior to launching.

A large number of guided missiles are rocket powered, and thus it is desirable, if possible, to use a fuel of the same general type as the rocket propellant for supplying the above-mentioned hydraulic and electric power, thus making possible the use of common handling and storage facilities. It is also desirable that the fuel used in the power unit be capable of storage under a wide variety of climatic conditions and be relatively safe to handle and not subject to loss by evaporation or deterioration due to absorption of moisture.

Guided missiles being usually (although not always) expendable items, it is highly desirable that they be as inexpensive as possible without any sacrifice in the accuracy and range of the propelling and guiding means.

Hydraulic power for guided missiles has usually been supplied from an electrically driven pump which in turn requires a battery or other electric power source, subject to the disabilities above noted. Furthermore, an electric motor used solely for the purpose of operating a pump represents a large element of the weight carried by the missile and consequently a valuable saving in load if it can be eliminated.

Still other conventional systems employ a hydraulic power source incorporating an air charged accumulator using very high pressures, e. g., 5000 to 7000 p. s. i. This requires large charging pumps in the field and is extremely dangerous to personnel. Also such accumulator systems are extremely temperature sensitive and therefore relatively useless where extremely wide temperature variations are to be encountered as in high altitude missile flights.

Bearing in mind the foregoing disadvantages of previous systems and also the above desiderata, it is a major object of the present invention to provide a power unit for supplying both electric and hydraulic power which unit employs, as a prime mover, a fuel burning reaction motor.

It is another object of the invention to provide a power unit of the class described in which the fuel supply is entirely contained within the motor itself, thus requiring no separate fuel storage tanks or controls for fuel feeds and/or carburetors.

Still another object of the invention is to provide a unit of the class described which may be quickly and simply refueled and yet is of simple design to reduce the manufacturing costs thereof to a minimum.

It is an additional object of the invention to provide a power unit of the class described which uses a solid, nonvolatile fuel which is relatively safe to store and handle.

A still further object of the invention is to provide for use in a power unit, retrievable missiles of the class described, a self-contained unitary fuel charge which is capable of easy storage and handling, as above described, which is relatively non-hygroscopic, thus remaining uniform in its burning characteristics over relatively long periods of time, and which can be quickly and easily installed in place in the power unit without the necessity of measuring or weighing out a quantity of fuel each time the power unit is refueled.

A further object of the invention is to provide in combination with a fuel charge of the class just described, an igniter which is safe against accidental ignition as by percussion, and which nevertheless assures a uniform and complete ignition of the fuel when operated.

Another object of the invention is to provide a controlled power unit for guided missiles which is not energized by the motion of the missile, but by its own self-contained fuel supply, and thus can be started on the launching stage just prior to the actual launching of the missile, or in some cases, after launching.

A still further object of the invention is to provide a guided missile power unit of the class described which can be supplied with external energizing power to bring the same up to speed and run it for an unlimited period prior to launching and during the stabilizing or warm-up run which precedes the launching.

An additional object of the invention is to provide in a guided missile power supply of the class described, two systems of speed regulation which may be operated independently or in conjunction to control the speed of the prime mover whereby to maintain a uniform rate of power delivery throughout the flight of the missile.

Still further, it is an object of the invention to provide in a power supply of the class described, speed responsive means for accurately regulating the voltage of electric power supplied therefrom.

The foregoing and additional objects and advantages of the invention will be apparent from the following detailed description thereof, such consideration being given likewise to the attached drawings, in which:

Figure 1 is an elevational axial section of a hydraulic and electric power supply embodying the present invention, particularly adapted and constructed for use in a guided missile;

Figure 2 is an elevational transverse section taken on the line 2—2 in Figure 1;

Figure 3 is an elevational transverse section taken on the line 3—3 in Figure 1;

Figure 4 is a fragmentary elevational view of the device of Figure 1 as seen from the direction of the arrow 4 in Figure 1;

Figure 5 is an enlarged fragmentary elevational section taken on the line 5—5 in Figure 3;

Figure 6 is an enlarged fragmentary portion of the device shown in Figure 1, particularly illustrating a number of hydraulic pumps employed therein;

Figure 7 is an elevational section taken on the line 7—7 in Figure 6;

Figure 8 is a horizontal fragmentary section taken on the line 8—8 in Figure 4;

Figure 9 is an oblique fragmentary section taken on the line 9—9 in Figure 4;

Figure 10:
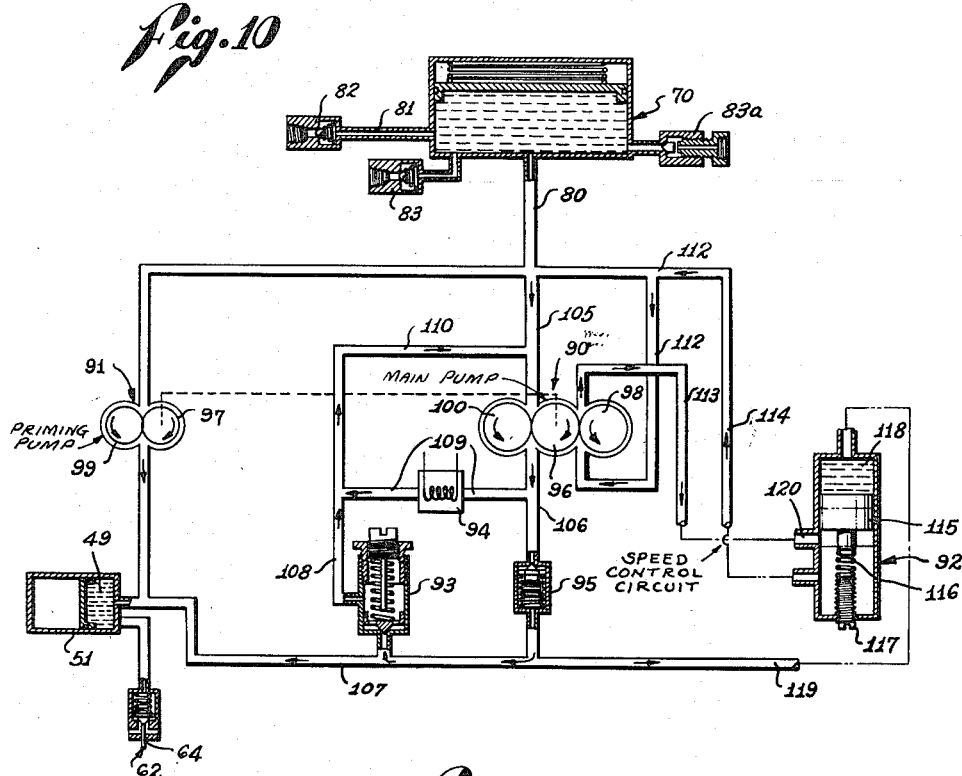
Figure 10 is a semi-schematic flow diagram illustrating the arrangement, character, and operation of the hydraulic controls employed in connection with the unit shown in Figure 1.

The unit illustrated and described herein as one possible embodiment of the invention, is designed as an intermediate section of the cylindrical body of a guided missile. Inasmuch as the main propelling motor (e. g., a rocket motor), the air foils, and flight controls (such as servo motors and the like) do not form a part of the present invention, it is deemed unnecessary to show or describe such elements in detail herein.

Referring to Figure 1, it will be seen that the power unit of the present invention is enclosed in an outer cylindrical housing 15, having formed at its end threaded connections 16a and 16b by which the unit may be incorporated directly into the cylindrical body of the missile. Transversely positioned within the housing 15 are a pair of bulkheads 17 and 18 on, and between which various elements of the power unit are supported, as will be described.

The prime mover of the power unit is a solid fuel burning reaction motor 20 having a rotatable combustion chamber 21 adapted to receive a solid cylindrically shaped charge 22 of fuel. The fuel charge 22 is inserted into the combustion chamber 21 through the rear thereof, the rear head 23 being threadedly attached to the combustion chamber 21 at 24 for removal to permit insertion of the fuel charge 22. The illustrated arrangement wherein the fuel charge 22 is inserted from the rear, i. e., the end opposite that at which combustion is initiated, has the advantage that the charge 22 itself acts as a seal for the threaded joint similar to an obturating plug or gas check plug used in naval "big guns" and similar ordnance.

As is shown, the cylindrical charge 22 is somewhat shorter than the interior length of the combustion chamber 21 whereby to leave a plenum chamber 25 within the combustion chamber 21 to the right of the charge 22 as seen in Figure 1. A spacer block 26 of polystyrene or other material capable of substantially complete combustion is secured to the forward end of the charge 22 and abuts against the right-hand head 27 of the combustion chamber 21 so as to accurately space the charge 22 within the chamber 21.

The fuel charge 22 is itself comprised of a rubber-like substance containing combustible materials and its own source of oxygen. Fuel of this general type is employed, among other places, in the expendable rocket motors employed in jet-assisted take-offs of aircraft. Inasmuch as the exact formula of the material making up the charge 22 is not an essential part of the present invention, it is deemed unnecessary to set forth such formulae herein. Suffice it to say that the material of which the charge 22 is composed may be of either of the formulae specified in the United States military specifications AN–525–J and/or AN–2011.

Solid fuels of the character just described are in general highly hygroscopic and as a result absorb moisture and change their burning rates and other characteristics if stored in an exposed condition for excessive lengths of time. The material specified as AN–2011 is particularly subject to such deterioration.

In order to obviate the difficulty just described, the charge 22 is encased at its sides and on its rearward end with a layer of kraft paper or similar sheet material, impregnated with a suitable waterproofing agent, such as asphaltum, such casing being designated by the reference character 28 in the drawings. The forward end of the charge 22, that is, the end adjoining the plenum chamber 25, is protected by a flat disc igniter 29 which is comprised of a material similar to the charge 22, but non-hygroscopic. Solid fuels of this type may be made relatively non-hygroscopic but only at some expense in other desirable characteristics. Thus, it is undesirable to make the entire body of the charge 22 from the same material as the igniter disc 29.

The disc 29 has embedded therein a spiral wire or ribbon 30 which serves as a fuse to fire the igniter in a manner to be described. The fuse ribbon 30 is centrally connected to an electric contact button 31 mounted in the spacer 26, the button 31 being arranged to make contact with a fixed button 32 supported on an insulated gland 33 mounted in the right-hand head 27 of the chamber 21. The outer end of the ribbon 30 is secured to a second electric contact member 34 embedded in the charge 22 and adapted to press outwardly against the wall of the combustion chamber 21, thus making grounding contact therewith.

Thus, by impressing an electric potential across the contact button 32 and the frame of the device, current can be caused to flow through the igniter ribbon 30. In the operation of the present device, such current is relatively high, thus causing the entire ribbon 30 to be brought to an extremely high temperature and vaporize in a very short time. Such vaporization of the ribbon 30 fires the igniter disc 29 which in turn ignites the main charge 22, substantially instantaneously across the entire end.

As will appear from the description of operations to follow herein, instantaneous ignition of the fuel charge 22 is important in the present device since it is desirable that the full torque of the power unit be developed in as short a time as possible in order to have available all hydraulic and electric power necessary for control at the instant of launching. Electrical connection to the contact button 32 is made through a commutator slip ring 35 and a stationary brush 39 bearing thereon, the latter being electrically connected to an external terminal (not shown) for the application of an electric potential to fire the igniter ribbon 30.

As can be seen best in Figure 2, the motor 20 has formed thereon a pair of radially extending arms 36 communicated by internal passages 37 therein with the plenum chamber 25. At the outer ends of the passages 37 they are turned in a tangential direction and have supported therein conventional Laval rocket nozzles 38 whereby the discharge of products of combustion from the plenum chamber 25 through the passages 37 and out the nozzles 38 produces a strong tangential reaction thrust rotating the entire motor 20 on axial stub shafts 40 and 40′ supported in ball bearings 41, 42, respectively, mounted in the bulkheads 17 and 18, respectively. Products of combustion are ultimately discharged from the missile through lateral orifices 48 in the housing 15. The outer end of the stub shaft 40 where it projects through the bulkhead 17 is formed with a transverse key 45 for the delivery of mechanical rotary power to other instrumentalities in the missile requiring such power.

The stub shaft 40' projecting from the right-hand end of the motor 20 is coupled by a key and slot coupling 46 to the drive shaft 47 of the system of hydraulic pumps mounted with associated valves and control elements in a hydraulic control body 50 secured to the bulkhead 18. The aforesaid system of pumps is shown in enlarged view in Figure 6, and also in Figures 3, 7 and 10.

For purposes of clarity in illustrating and describing the character and operation of the hydraulic system, the physical location of the elements is shown in Figures 1, and 3 through 9, and the functional relationship is shown in Figure 10, the elements and the various passageways interconnecting the same being shown in schematic flow diagram style in the latter figure, and not necessarily in their actual physical location.

A storage reservoir 70 is formed within the bulkhead 18 and is closed at the left end by a movable piston 71 urged to the right by a compression spring 72 anchored in a transverse plate 73 which is fixed with respect to the bulkhead 18. The piston 71 slides on a boss 74 formed in the bulkhead 18 and is sealed thereto by an O-ring 75.

Fluid in the reservoir 70 is delivered through a passageway 80 for the pressurization by the pumping system as will be described. An initial pressure, or priming pressure is created on the fluid in the reservoir 70 by the action of the compression spring 72. In this connection, it should be noted that when the motor 20 is in operation, such priming pressure or initial pressure is increased due to the fact that compressed products of combustion exert a force on the left surface of the piston 71, being communicated thereto through apertures 78 in the plate 73. Return fluid from the hydraulic system of the missile is delivered back into the reservoir 70 near its periphery as shown in Figure 8. The return conduit 81 is provided with a terminal connector 82 having a check valve therein (see Figure 10). A connector 83 having a check valve therein is also mounted in the stationary wall of the reservoir 70 for initially charging the same with fluid, and an air bleeder valve 83a is provided for the purpose of bleeding off any entrapped air therein (see Figure 10).

To the right of the hydraulic control body 50 is supported an hydraulic accumulator 51 comprising a pair of flanged bells 52 and 53 peripherally bolted together with a diaphragm 54 clamped therebetween. Hydraulic fluid is pumped from the reservoir 70 into a chamber 49 to the right of the diaphragm 54 in the manner to be hereinafter described in more detail, and the leftward movement of the diaphragm thus caused, compresses air in a chamber 55 between the diaphragm 54 and the left-hand bell 52.

In some instances, it is desirable to charge the air chamber 55 of the accumulator 51 with compressed air at an initial pressure whereby to produce a given static pressure of the hydraulic fluid contained in the chamber 49 on the opposite side of the diaphragm 54. For this purpose, a compressed air supply nipple 85 is mounted in one edge of the accumulator as shown in Figure 9. The supply nipple 85 contains a conventional air check valve of the type used in pneumatic tires, and is protected by a conventional dust cap 86. Access to the air supply nipple 85 is provided through an aperture 87 in the outer wall of the housing section 15.

Pressurized hydraulic fluid in the accumulator chamber 49 is released therefrom into the hydraulic system of the missile through a terminal fitting 56 by which the main hydraulic system is coupled to the power unit. The fitting 56 comprises a nipple 57 having O-ring seals 58 supported thereon whereby to sealably receive an hydraulic coupling 59 for interconnection of radial passages 60 in the nipple 57 with longitudinal passages 61 in the coupling 59.

A check valve 62 is mounted in the fitting 56 and normally held closed by a compression spring 63 to prevent escape of fluid from the accumulator when not coupled to the main system of the missile. When the coupling 59 is secured to the nipple 56, an extending stem 64 is depressed, opening the check valve 62 and releasing the fluid into the hydraulic system through the coupling 59 as aforesaid.

The hydraulic pumping and control elements contained in the body 50 consist of a three-gear main pump 90, a priming pump 91, a pressure-sensitive speed control valve 92, a pressure regulating relief valve 93, a solenoid operated bypass valve 94, and a check valve 95. As above stated, the relative physical location of these elements in the body 50 is best seen from an examination of Figure 1, and Figures 3 through 9, while the fluid interconnection of all the hydraulic elements is best seen in Figure 10.

As can be seen best in Figure 6, a central gear 96 and a drive gear 97 of the main pump and charging pump 90 and 91, respectively, are both secured to the pump drive shaft 47. Thus, both of the pumps 90 and 91 operate continuously so long as the reaction motor 20 is rotating. The main pump 90 serves the dual function of continuously supplying pressurized hydraulic fluid during the flight of the missile, and also providing an overriding speed control for the reaction motor 20. The priming pump 91, although operating continuously during the flight time and thus providing some pressurized fluid, has the primary purpose of operating during the warm-up period preliminary to launching whereby to prime the accumulator 51 by transferring an initial volume of fluid from the reservoir 70 into the accumulator.

As can be seen best in Figure 10 during the actual operation of the missile in flight, the main supply pump section comprised of the central gear 96 and the gear 100 functions to receive fluid under initial pressure from the reservoir 70 through passageways 80 and 105, and to deliver the same under operating pressure through a passageway 106, the check valve 95, and a passageway 107 to the accumulator 51. When the fluid in the chamber 49 of the accumulator 51 reaches a certain predetermined operating pressure, such pressure backed up in the line 107 serves to open the relief valve 93 and permit fluid to bypass through a passageway 108 and 110 back to the input conduit 105. Thus, once the pressure in the accumulator chamber 49 reaches the operating value to which the relief valve 93 has been set, fluid is thereafter recirculated until the pressure again drops below the operating value, resulting in a closing of the relief valve 93.

It will also be noted that fluid will be circulated through a secondary bypass 109 so long as the solenoid operated valve 94 therein is open. The purpose of this last arrangement is to permit (by holding the valve 94 open) of free operation of the device during the warm-up period without delivering fluid in excess of that delivered by the priming pump 91.

The speed control function of the main pump 90 is performed by a section thereof comprised of a central gear 96 and a side gear 98 meshing therewith. The speed control pump 96, 98 receives fluid from the reservoir 70 through a branch passageway 112, and pumps it through a pressure passageway 113 to the speed control valve 92, through which it normally can pass unrestrictedly through a return passageway 114, back to the inlet passageway 112. Thus it will be seen that so long as the speed control valve 92 is open, the speed control pump 96, 98 merely circulates fluid therethrough against substantially no load.

The speed control valve 92 includes a pressure sensitive valving member 115, normally urged to open position by a compression spring 116, the force of which may be adjusted by an anchor screw 117. As can be seen best in Figure 10, the valving member 115 forms the movable wall of a pressure chamber 118, which is communicated through a passageway 119 to the high pressure line 107 receiving fluid from the main supply pump 96, 100. The opening force of the spring 116 is so adjusted by means of the anchor screw 117 that when the pressure in the chamber 118 reaches the desired operating pressure, the valving member 115 is moved to close off the inlet 120 of the valve 92. Thus the control pump section 96, 98 which was previously operating against substantially no load, now is subjected to a heavy load of pumping against a closed system. Such increase in load acts as a braking force on the motor 20, thus slowing the same. Such reduction in speed is reflected in a reduction of the rate of delivery of fluid and when such delivery rate drops to a point where it is less than the rate of consumption of pressurized fluid from the accumulator 51, the back pressure in the conduit 107 and hence in the chamber 118 of the speed control valve 92 falls sufficiently to allow the valving member 115 to be moved by the spring 116, thus reopening the circuit through the pump section 96, 98, and removing the braking force from the motor. By appropriate design of the shape of the inlet 120, the valving member 115 can be made to perform a throttling action, thus resulting in a very accurate control of the speed in accordance with the demands for pressurized fluid made on the accumulator 51.

Figure 11:
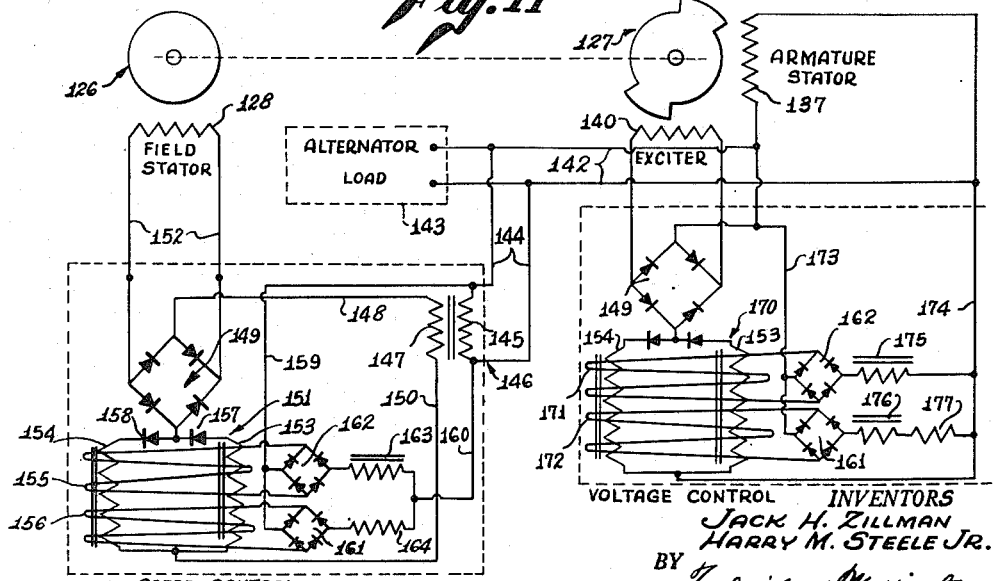
Figure 11 is a wiring diagram showing the connection and operation of the electrical control circuits employed in connection with the power unit illustrated in Figure 1.

For a description and discussion of the electrical power supply system and controls, reference is now made to Figures 1 and 11. The electric power components of the unit include a D. C. generator 125, an induction motor-brake 126, and an A. C. inductor-alternator 127. The stator 128 of the D. C. generator 125, and the field 129 of the induction motor 126 are both held in fixed position in the outer housing 15, being clamped between spacer rings 130, 131 and 132, the latter being held in place by axial pressure exerted by a threaded securing ring 133, in the left-hand end of the housing 15. As will be noted, the ring 133 also serves to hold the bulkheads 17 and 18, the hydraulic control body 50, and the accumulator 51 in place by urging the same all against an internal abutment ring 134 formed in the outer housing 15.

The rotor 135 of generator 125 and the armature 136 of the induction motor 126 are mounted on the rotary combustion chamber 21 and thus rotated thereby relative to their respective stator elements. The stator 137 of the induction-alternator 127 is fixed in the bulkhead 18 by means similar to those employed in connection with the D. C. generator and induction motor, and the inductor rotor 138 is mounted on an extending hub 139 formed in the right end head of the rotary combustion chamber 21. A stationary excitation winding 140 for the induction-alternator 127 is mounted adjacent the rotor 138, being supported on the anchor plate 73.

The direct current output of the generator 125 is delivered through a commutator brush assembly 141 (see Figure 1) of conventional design, mounted on the left end of the rotary combustion chamber 21. Electric leads from the generator 125, the motor 126 and the alternator 127 are all brought to a common connection terminal (not shown) for delivery of the desired electric currents and also for the connection of various control elements to be described. Inasmuch as the shape, size and means for mounting the various electrical control elements is not a part of the present invention, which resides rather in the electrical characteristics of such control elements, it is deemed unnecessary to describe or illustrate the shape and size of the aforesaid electrical components.

During the warm-up period of the missile prior to launching, alternating current from an external source is delivered to the motor 126 whereby to rotate the combustion chamber 21 electrically to bring the same up to approximately operating speed and operate the priming pump 91 to precharge the accumulator 51 as previously described. During such warm-up period, direct current is delivered by the generator 125 and alternating current is delivered by the induction-alternator 127. Thus, all the hydraulic and electric controls in the missile can be tested and operated prior to launching, as can be the actual voltage supply circuits in the unit. After launching, the motor 126 serves as a speed control or governor brake as will be described.

The speed control and voltage control circuits are comprised of conventional electrical elements located in an unshown part of the missile in which the unit 15 is installed and are shown schematically in Figure 11. Here it will be seen that the output of the inductor-alternator 127 is delivered through supply buses 142 to the load 143. The output current in the buses 142 is also delivered through conductors 144 to the primary winding 145 of a transformer 146, the secondary winding 147 of which is employed to actuate a speed control circuit. One side 148 of the relatively low voltage secondary winding 147 is connected to one of the input terminals of a full wave rectifier bridge 149. The other side 150 of the secondary winding 147 is connected through a saturable reactor amplifier 151 to the other input terminal of the rectifier bridge 149.

The output terminals of the inductor bridge 149 are connected through conductors 152 to the field stator of the induction motor 126. It will be appreciated that, during the actual operation of the reaction motor 20, the motor 126 acts not as a motor, but as a brake, the amount of braking force being proportional to the current through the field stator 129.

As thus far described, it will be realized that the current output of the transformer secondary 147 will be rectified by the bridge 149 and applied as a pulsating direct current across the field stator 128. It will be recognized further that the value of such current applied to the stator 128 and hence the braking force exerted on the system through the operation of the motor 126 will depend on the impedance of the saturable reactor system 151.

The saturable reactor 151 comprises four superimposed toroidal windings 153, 154, 155 and 156. Two of the windings 153 and 154 are termed "current windings" herein and are connected in parallel, one common connection being connected to the current supply conductor 150, and the other ends of the windings 153 and 154 being connected through rectifiers 157 and 158 to the rectifier bridge 149. Thus, during one half of the alternating current cycle, current flows through one of the current windings, e. g., 153, and through the other half of the cycle, the current flows through the other current winding 154. The direction of such windings on the toroidal core of the saturable reactor 151 is such that whichever of the two is passing current at a given instant, the result is to magnetize the reactor core in the same direction. This is termed the D. C. bias magnetization.

The other two windings 155 and 156 of the reactor 151 are termed herein the "control windings," and the direction of their winding on the core of the saturable reactor 151 is such that if equal currents are present in the two control windings, their magnetization effect cancels out, thus having no effect on the magnetization of the toroidal core.

The two control windings 155 and 156 are fed through conductors 159 and 160 from the output of the inductor-alternator applied through full wave rectifier bridges 161 and 162 so as to deliver pulsating direct current to the control windings. One of the control windings 155 has a choke 163 interposed in its supply circuit, while the other control winding 156 has a resistor 164 interposed in the supply circuit. The inductance of the choke 163 is such that its impedance at the desired operating frequency of the inductor-alternator is equal to the resistance of the resistor 164. Thus when the reaction motor 20 is rotating at the desired speed and the inductor-alternator is therefore delivering current at the predetermined operating frequency, the impedances and thus the currents in the supply circuits of the two control windings 155 and 156 are equal, and the control windings 155 and 156 cancel each other and exert no magnetizing control on the saturable reactor 151. When the entire system is operating below speed, however, the frequency of the inductor-alternator output is below normal and thus the impedance of the choke 163 is less than the resistor 164, wherefore a greater current flows in the control winding 155 than in the winding 156. The direction of the winding 155 with respect to the current windings 153 and 154 is such that the D. C. magnetizing components of the windings 153 and 154 are partially canceled by the magnetization effect of the winding 155, thus increasing the impedance of the saturable reactor insofar as the braking current is concerned, and thus ultimately reducing the braking current, permitting the entire system to gain speed.

If, on the other hand, the system tends to operate at a speed greater than normal, the frequency of the inductor-alternator output becomes higher than normal and the impedance of the choke 163 becomes greater than the resistor 164, whereupon the current in the control winding 156 exceeds that in the winding 155. Since the direction of the winding 156 is such as to augment the D. C. component magnetization caused by the current windings 153 and 154, the core of the reactor 151 becomes saturated, its impedance drops, and as a result the current through the field stator 128 increases, exerting a braking torque on the system.

Thus it is seen that the sensing element in the speed control circuit is the choke 163, the impedance of which changes with frequency. The resistor 164 is, in effect, a standard, unaffected by frequency, against which the variable impedance of the choke 163 is measured. Variations in such impedance, in response to variations in frequency, are reflected as a modulating control current varying the total impedance of the saturable reactor 151. Such modulated current is, in turn, employed to apply variable braking force to the system through the motor-brake 126, whereby to correct the speed change sensed by the choke 163.

The voltage control circuit shown in Figure 11 is similar to the speed control circuit employing a saturable reactor 170 having control windings 171 and 172, fed through leads 173—174 from the armature stator 137 of the inductor-alternator 127. Other elements of the voltage control circuit are identical to those of the speed control circuit and thus designated with the same reference characters.

The sensing elements of the voltage control circuit comprise chokes 175 and 176, and a resistor 177 connected in series with the latter choke. These elements are connected to the input to the control windings 171 and 172, in a manner equivalent to the arrangement shown and described in connection with the speed control. The modulated output of the saturable reactor 170 is fed through a rectifier bridge 149 to the excitor winding 140 of the inductor-alternator 147. Variations in the excitation current will vary the voltage output of the armature stator 137 in conventional manner.

The sensing of voltage variations by the chokes 175 and 176 is accomplished by designing one of them, 175, to have an impedance which is a substantially linear function of voltage, and the other of them, 176, of impedance which is substantially independent of voltage for voltages above one-half the nominal desired voltage. The choke 176 is designed to approach saturation at approximately half normal voltage and thus the impedance thereof remains substantially constant for all voltages in excess of one-half nominal voltage.

The direction of windings 171 and 172 fed through the chokes 175 and 176, respectively, is such that the differential impedance of the chokes 175 and 176 at voltages less than the desired control voltage produces a differential control magnetization such as to augment the D. C. component produced by the windings 153 and 154, saturate the core as previously described, and thus cause a relatively high excitation current to flow through the saturable reactor 170. As the output voltage of the inductor-alternator 127 increases, the impedances of the input circuits to the windings 171 and 172 become more and more nearly equal and when the desired voltage is reached, the D. C. component magnetization of the saturable reactor 170 is in part cancelled, whereby its impedance is increased, and the excitation current accordingly decreased.

Thus it will be seen that the sensing and modulating means used to control both speed and voltage are comprised of sensitive, yet rugged elements. In the case of the speed control, the correction effect is relatively abrupt when the desired speed is reached, due to the fact that the system operates at a point on the frequency-impedance curve of the choke 163 wherein the latter is changing its impedance at a maximum rate with respect to the change in frequency. In the case of the voltage control, on the other hand, the corrective effect is more nearly linear. That is, the corrective change in excitation current is applied more or less uniformly with increasing voltage over a substantial range of voltages starting at a point substantially less than nominal voltage and ending at a point substantially above normal voltage. Smooth control of this type is desirable in the correction of voltages in that it is necessary to avoid introducing transient signals, such as abrupt voltages, into the electrical control circuits of the missile.

As to speed control, on the other hand, a rather abrupt correction at nominal speed is possible since transients in frequency modulation will be relatively less harmful than voltage transients.

As previously stated, the electrical speed control system may be used either in conjunction with, or independently of the hydraulic speed control. In general, the presently preferred arrangement is one in which the electrical braking system is set to operate at a nominal speed lower than that of the hydraulic system whereby the speed is primarily governed by the electrical system, and the hydraulic speed control takes over only in the event of a failure of the electrical system, or in the event that a temporary heavy drain on the electrical system makes it incapable of completely controlling the speed. Also, it will be noted that under certain circumstances, it may be desirable to have the missile operate over a part or even all of its range with the controls confined to either hydraulic or electrical controls, and to thereafter shift controls from hydraulic to electric, or vice versa. In such cases, it is necessary to have a speed control for the reaction motor 21 which will be operative irrespective of whether the flight control system is entirely hydraulic, entirely electrical, or both.

While the power unit shown and described herein is fully capable of achieving the objects and providing the advantages hereinbefore stated, it will be realized that it is capable of considerable modification without departure from the spirit of the invention. For this reason, we do not mean to be limited to the form shown and described, but rather to the scope of the appended claims.

We claim:

1. A reaction motor comprising: a pressure tight combustion chamber adapted to receive a body of fuel of less volume than said chamber and having means therein to support said body spaced from an interior wall portion of said chamber to form a plenum chamber adjacent said wall portion; bearing means supporting said chamber for rotation about a fixed axis; at least one jet nozzle in the wall of said combustion chamber disposed tangentially with respect to said axis and communicated with said plenum chamber to cause rotation of said chamber when said fuel is burned; and speed sensitive braking means rotatively coupled to said chamber to regulate the speed of rotation thereof.

2. A mechanico-electric power unit comprising: a pressure tight combustion chamber adapted to receive a body of fuel of less volume than said chamber and having means therein to support said body spaced from an interior wall portion of said chamber to form a plenum chamber adjacent said wall portion; bearing means supporting said chamber for rotation about a fixed axis; at least one jet nozzle in the wall of said combustion chamber disposed tangentially with respect to said axis and communicated with said plenum chamber to cause rotation of said chamber when said fuel is burned; and magneto-motive power means having relatively rotatable adjacent elements, one of which is supported on said combustion chamber for rotation therewith, and the other of which is fixed with respect to said bearing means.

3. A mechanico-electrical power unit comprising: a pressure tight combustion chamber adapted to receive a body of fuel for combustion therein; bearing means supporting said chamber for rotation about a fixed axis; at least one jet nozzle in the wall of said combustion chamber disposed tangentially with respect to said axis to cause rotation of said chamber when said fuel is burned; an alternating current generator drivingly coupled to said chamber to deliver alternating current at a frequency dependent on the rotary speed of said chamber; and electric brake means mechanically coupled to said chamber and electrically connected to said generator whereby to apply braking torque to said chamber whenever said rotary speed exceeds a predetermined value.

4. A reaction motor comprising: a pressure tight combustion chamber adapted to receive a body of fuel for combustion therein; bearing means supporting said chamber for rotation about a fixed axis; at least one jet nozzle in the wall of said combustion chamber disposed tangentially with respect to said axis to cause rotation of said chamber when said fuel is burned; a fluid pump rotatively coupled to said chamber to deliver pressurized fluid when said chamber is rotated as aforesaid; and speed regulating means comprising a restrictor valve in the output of said pump and responsive to the rotary speed of said chamber to close said valve and impose an extra torque load on said chamber when said speed exceeds a predetermined value.

5. A mechanico-hydraulic power unit comprising: a pressure tight combustion chamber adapted to receive a body of fuel for combustion therein; bearing means supporting said chamber for rotation about a fixed axis; at least one jet nozzle in the wall of said combustion chamber disposed tangentially with respect to said axis to cause rotation of said chamber when said fuel is burned; two fluid pumps rotatively coupled to said chamber to deliver pressurized fluid when said chamber is rotated as aforesaid; and speed regulating means comprising a pressure actuated restrictor valve in the output of one of said pumps and responsively connected to the output of the other pump whereby to apply an increased torque load to said chamber whenever the rotary speed thereof exceeds a predetermined value.

6. An electric and hydraulic power unit comprising: a pressure tight combustion chamber adapted to receive a body of fuel for combustion therein; bearing means supporting said chamber for rotation about a fixed axis; at least one jet nozzle in the wall of said combustion chamber disposed tangentially with respect to said axis to cause rotation of said chamber when said fuel is burned; an alternating current generator drivingly coupled to said chamber to deliver alternating current at a frequency dependent on the rotary speed of said chamber; electric brake means mechanically coupled to said chamber and electrically connected to said generator whereby to apply braking torque to said chamber whenever said rotary speed exceeds a first predetermined value; two fluid pumps rotatively coupled to said chamber to deliver pressurized fluid when said chamber is rotated as aforesaid; and overriding speed regulating means comprising a fluid pressure actuated restrictor valve in the output of one of said pumps and responsively connected to the output of the other pump whereby to apply an increased torque load to said chamber whenever the rotary speed thereof exceeds a second predetermined value greater than said first value.

7. A reaction motor driven power unit comprising: a pressure tight combustion chamber adapted to receive a body of fuel for combustion therein; bearing means supporting said chamber for rotation about a fixed axis; at least one jet nozzle in the wall of said combustion chamber disposed tangentially with respect to said axis to cause rotation of said chamber when said fuel is burned; drive means rotatively coupled to said chamber to derive rotary mechanical power therefrom; an externally powered electric motor rotatively coupled to said chamber whereby to bring the same to a desired speed of rotation prior to ignition of said fuel, said electric motor being adapted when disconnected from its power source to receive an electric control current and apply resistive torque to said chamber in a direction to resist the rotation caused by said nozzle; and speed control means responsive to the rotary speed of said chamber and electrically connected to said external motor means whereby to apply said braking torque when said rotary speed exceeds a predetermined value.

8. A hydraulic power unit comprising: a pressure tight combustion chamber adapted to receive a body of fuel for combustion therein; bearing means supporting said chamber for rotation about a fixed axis; at least one jet nozzle in the wall of said combustion chamber disposed tangentially with respect to said axis to cause rotation of said chamber when said fuel is burned; a fluid pump rotatively coupled to said chamber to deliver pressurized fluid when said chamber is rotated as aforesaid; external motor means rotatively coupled to said chamber to bring the same up to speed prior to ignition of said fuel; a by-pass between the input and output of said pump; and selectively operable valve means in said bypass, whereby by-pass may be opened during operation of said external motor means and closed upon ignition of said fuel.

9. The construction of claim 8 further characterized by having a hydraulic accumulator connected to receive the output of said pump, and a second priming pump rotatively coupled to said chamber and independent of said bypass to deliver pressurized fluid to said accumulator during the rotation of said chamber by said external motor means prior to said fuel ignition.

10. The construction of claim 8 further characterized by having a hydraulic accumulator connected to receive fluid from said pump, and speed regulating means for said chamber comprising a second pump rotatively coupled to said chamber and a fluid pressure actuated valve in the output of said second pump responsive to pressure in said accumulator to close said valve and apply an extra torque load to said chamber whenever the pressure in said accumulator exceeds a predetermined value.

11. A hydraulic power unit comprising: a pressure tight combustion chamber; bearing means supporting said chamber for rotation about a fixed axis; at least one jet nozzle in the wall of said combustion chamber disposed tangentially with respect to said axis to cause rotation of said chamber when fuel is burned in said chamber; a fluid pump rotatively coupled to said chamber to deliver pressurized fluid when said chamber is rotated as aforesaid; housing means to confine the products of combustion discharged by said nozzle whereby to maintain the same under pressure; a reservoir fluid-connected to said pump to supply the same with fluid; and movable wall means in said reservoir exteriorly exposed to said confined gases whereby to subject fluid in said reservoir to an initial pressure.

12. A reaction motor power unit comprising: a cylindrical housing; a pair of spaced transverse bulkheads supported in said housing, said bulkheads having axially aligned bearings therein; a closed cylindrical combustion chamber having stub shafts extending from the ends thereof and received in said bearings to support said chamber for rotation within said housing; a tangentially disposed jet nozzle on said chamber communicated with the interior of said chamber to cause rotation thereof upon burning fuel therein; and a magneto motive power unit having a stator mounted in said housing and a rotor surrounding and secured to said chamber adjacent said stator.

13. A reaction motor hydraulic power source comprising: a rotary reaction motor; a three-gear pump drivingly coupled to said motor, said pump having an inlet and an outlet to a working section therein comprised of a first and second gear thereof, and a separate inlet and outlet to a control section therein comprising said first and the third gear in said pump; and speed control means comprising a bypass between the inlet and outlet of said control section, and a pressure actuated valve in said bypass responsively connected to the output of said working section to close said valve when the output of said working section reaches a predetermined value.

14. A reaction-motor driven hydraulic power source comprising: a rotary reaction motor; a three-gear pump drivingly coupled to said motor, said pump having an inlet to a working section therein comprised of a first and second gear thereof, and a separate inlet and outlet to a control section therein comprising said first gear and the third gear of said pump; a hydraulic accumulator connected to the output of said working section to receive pressurized fluid therefrom; a bypass with a pressure responsive relief valve therein connected between the outlet and inlet of said working section to limit the pressure of fluid delivered to said accumulator; and speed control means comprising a bypass between the inlet and outlet of said control section and a pressure actuated valve in said control bypass responsively connected to the output of said working section to close said control valve when the output pressure of said working section reaches a predetermined value.

15. A reaction motor driven hydraulic power source comprising: a rotary reaction motor; a three-gear pump drivingly coupled to said motor, said pump having an inlet to a working section therein comprised of a first and second gear thereof, and a separate inlet and outlet to a control section therein comprising said first gear and the third gear of said pump; a hydraulic accumulator connected to the output of said working section to receive pressurized fluid therefrom; a bypass with a pressure responsive relief valve therein connected between the outlet and inlet of said working section to limit the pressure of fluid delivered to said accumulator; speed control means comprising a bypass between the inlet and outlet of said control section and a pressure actuated valve in said control bypass responsively connected to the output of said working section to close said control valve when the output pressure of said working section reaches a predetermined value; a separately powered motor coupled to said reaction motor to rotate the same without actuating the same; a priming pump coupled to said motor and fluid connected to said accumulator to deliver pressurized fluid to the latter during operation of said separately powered motor; and externally operable valve means in the bypass of said working section to deactivate the latter during said operation of said separately powered motor.

16. The construction of claim 15 further characterized in that said separately powered motor is an alternating current motor adapted upon disconnecting the power therefrom and the connection of direct current thereto, to apply resistive torque to said reaction motor to control the speed thereof independently of said hydraulic means.

17. A reaction motor driven hydraulic power source comprising: a rotary reaction motor; a main pump drivingly coupled to said motor; a hydraulic accumulator connected to the output of said main pump to receive pressurized fluid therefrom; a separately powered motor coupled to said reaction motor to rotate the same without actuating the same; a priming pump coupled to said reaction motor and fluid connected to said accumulator to deliver pressurized fluid to the latter during operation of said separately powered motor; and a bypass with a normally closed externally operable valve therein connected between the input and output of said main pump to deactivate the same during said operation of said separately powered motor.

18. The construction of claim 17 further characterized in that said separately powered motor is an alternating current motor adapted upon disconnecting the power therefrom and the connection of direct current thereto, to apply resistive torque to said reaction motor to control the speed thereof independently of said hydraulic means.

19. A mechanico-electric power unit comprising: a pressure tight combustion chamber having a body of fuel therein of less volume than said chamber, said body being supported in said chamber spaced from an interior wall portion thereof to form a plenum chamber adjacent said wall portion; bearing means supporting said chamber for rotation about a fixed axis passing through the center of gravity of said body; at least one jet nozzle in the wall of said combustion chamber disposed tangentially with respect to said axis and communicated with said plenum chamber to cause rotation of said chamber when said fuel is burned; and magneto-motive power means having relatively rotatable adjacent elements, one of which is connected to said combustion chamber for rotation therewith, and the other of which is fixed with respect to said bearing means.

20. A reaction motor unit comprising: a cylindrical housing; a pair of spaced transverse bulkheads supported in said housing, said bulkheads having axially aligned bearings therein; a closed cylindrical combustion chamber having stub shafts extending from the ends thereof on the axis of said cylindrical chamber and received in said bearings to support said chamber for rotation within said housing; a tangentially disposed jet nozzle in said chamber communicated with the interior of said chamber to cause rotation thereof upon burning fuel therein; and an induction motor having a stator mounted in said housing and a rotor co-axial with and secured to said chamber adjacent said stator for applying a driving torque to said chamber prior to said burning of said fuel and for applying a braking torque to said chamber upon rotation thereof in response to said burning of said fuel.

References Cited in the file of this patent

UNITED STATES PATENTS

| Number | Name | Date |
|---|---|---|
| 892,757 | Mosier | July 7, 1908 |
| 1,315,081 | Bradley | Sept. 2, 1919 |
| 1,825,661 | Gull | Oct. 6, 1931 |
| 1,877,091 | Vickers | Sept. 13, 1932 |
| 2,106,493 | Byers | Jan. 25, 1938 |
| 2,257,095 | Gottlieb | Sept. 30, 1941 |
| 2,386,219 | Lauck | Oct. 9, 1945 |
| 2,456,938 | Harder | Dec. 21, 1948 |
| 2,479,470 | Carr | Aug. 16, 1949 |
| 2,509,359 | Margolis | May 30, 1950 |
| 2,536,024 | Billups | Jan. 2, 1951 |
| 2,539,404 | Crutchfield et al. | Jan. 30, 1951 |
| 2,551,111 | Goddard | May 1, 1951 |
| 2,558,572 | Logan | June 26, 1951 |
| 2,563,265 | Parsons | Aug. 7, 1951 |
| 2,592,938 | McNaught | Apr. 15, 1952 |
| 2,597,641 | Hull | May 20, 1952 |
| 2,599,209 | Tenney et al. | June 3, 1952 |
| 2,620,627 | Nardone | Dec. 9, 1952 |
| 2,623,465 | Jasse | Dec. 30, 1952 |

FOREIGN PATENTS

| Number | Country | Date |
|---|---|---|
| 28,869 | France | Jan. 8, 1925 |